235-379 SR

1/27/87 OR 4,639,582

United States Patent [19]

Arikawa et al.

[11] Patent Number: 4,639,582

[45] Date of Patent: Jan. 27, 1987

[54] CIRCULATING-TYPE BILL DEPOSITING AND DISBURSING MACHINE

[75] Inventors: Junichi Arikawa; Hiroshi Chiba, both of Urawa; Osamu Miyazaki, Kawaguchi; Masatoshi Osanai, Urawa, all of Japan

[73] Assignee: Laurel Bank Machines Co., Ltd., Tokyo, Japan

[21] Appl. No.: 733,786

[22] Filed: May 14, 1985

[30] Foreign Application Priority Data

May 16, 1984 [JP] Japan .................................. 59-98292
May 16, 1984 [JP] Japan .................................. 59-98293

[51] Int. Cl.[4] ............................................. G06F 15/30
[52] U.S. Cl. ..................................................... 235/379
[58] Field of Search ........................................ 235/379

[56] References Cited

U.S. PATENT DOCUMENTS 4,585,988 4/1986 Watanabe ............................ 235/379

*Primary Examiner*—Harold I. Pitts
*Attorney, Agent, or Firm*—Fleit, Jacobson, Cohn & Price

[57] ABSTRACT

A circulating-type bill depositing and disbursing machine has a depositing and disbursing box. The box is adapted for storage of undamaged and damaged bills. First and second storing parts are provided for temporarily storing received bills and for transferring the receive bills to the depositing and disbursing box. The first and second storing parts are provided with a storing front plate and a holding plate for clamping the received bills therebetween. The first and second storing parts are further provided with an operable bottom plate for transferring the bills into the depositing and disbursing box.

6 Claims, 26 Drawing Figures

CIRCULATING-TYPE BILL DEPOSITING AND DISBURSING MACHINE

BACKGROUND OF THE INVENTION

The present invention relates to a circulating-type bill depositing and disbursing machine which can receive and dispense bills and has a circulating and distributing function allowing received bills to be reused as disbursable ones.

Conventionally, circulating-type bill depositing and disbursing machines are installed in the branches of financial institutions, and the management of bills is effected as follows: In order to reduce operations at the time of starting and completing operations by using one detachable depositing and disbursing box, at the time of starting operations, disbursable bills of mixed denomination inside the depositing and disbursing box are distributed to disbursing bill storing sections for each type of bill inside a machine body, and, at the time of completing operations, bills inside these storage sections for each type of bill are collected and stored in the depositing and disbursing box.

Then, during opertions, received bills are housed in this depositing and disbursing box, and in cases where undamaged bills for disbursement have become short in supply, undamaged bills of the denomination in short supply are distributed from amongst the bills inside the depositing and disbursing box, while the bills of other denomination are returned to and stored in the depositing and disbursing box.

However, there have been drawbacks in that, if the storage sections for undamaged and damaged bills, or sections for storing surplus bills when the former storage sections are full, are dispersed in a plurality of locations, the efficiency of handling these bills becomes poor at the time of starting and completing operations or at the time of operation, and the machine body becomes large in size.

SUMMARY OF THE INVENTION

Accordingly, an object of the invention is to provide a circulating-type bill depositing and disbursing machine which effectively overcomes the aforementioned drawbacks of the prior art and which makes it possible to incorporate the depositing and disbursing boxes into one unit and to make the width of the machine body smaller, and which is also advantageous in terms of the handling efficiency of the depositing and disbursing box and the management of bills.

The present invention is arranged as follows: Bills received are sorted out into undamaged and damaged bills and stored in an upright state in the front and vertical positions of the machine body, and these undamaged and damaged bills are fed into and stored in the depositing and disbursing box as they are in the upright state. At this juncture, a storage bottom plate for supporting undamaged damaged bills is retracted for stand-by.

Furthermore, a number of bills are accumulated reversely in a storing section, and, at the same time, bills are set in an upright state by a striking-in car which rotates faster than an accumulating car, and the bills are retained in this state. Additionally, bills are guided to their upright state by an auxiliary belt provided on a storage bottom plate.

DESCRIPTION OF THE DRAWINGS

Other objects and advantages of the present invention will become apparent from the following description made with reference to the accompanying drawings, in which.

DESCRIPTION OF THE PREFERRED EMBODIMENTS

Description of the present invention will be made hereafter with respect to a case where the invention is used as a circulating-type bill depositing and disbursing machine for window use which is used by a teller (a window clerk) at the window of a financial institution such as a bank.

Figure 1:
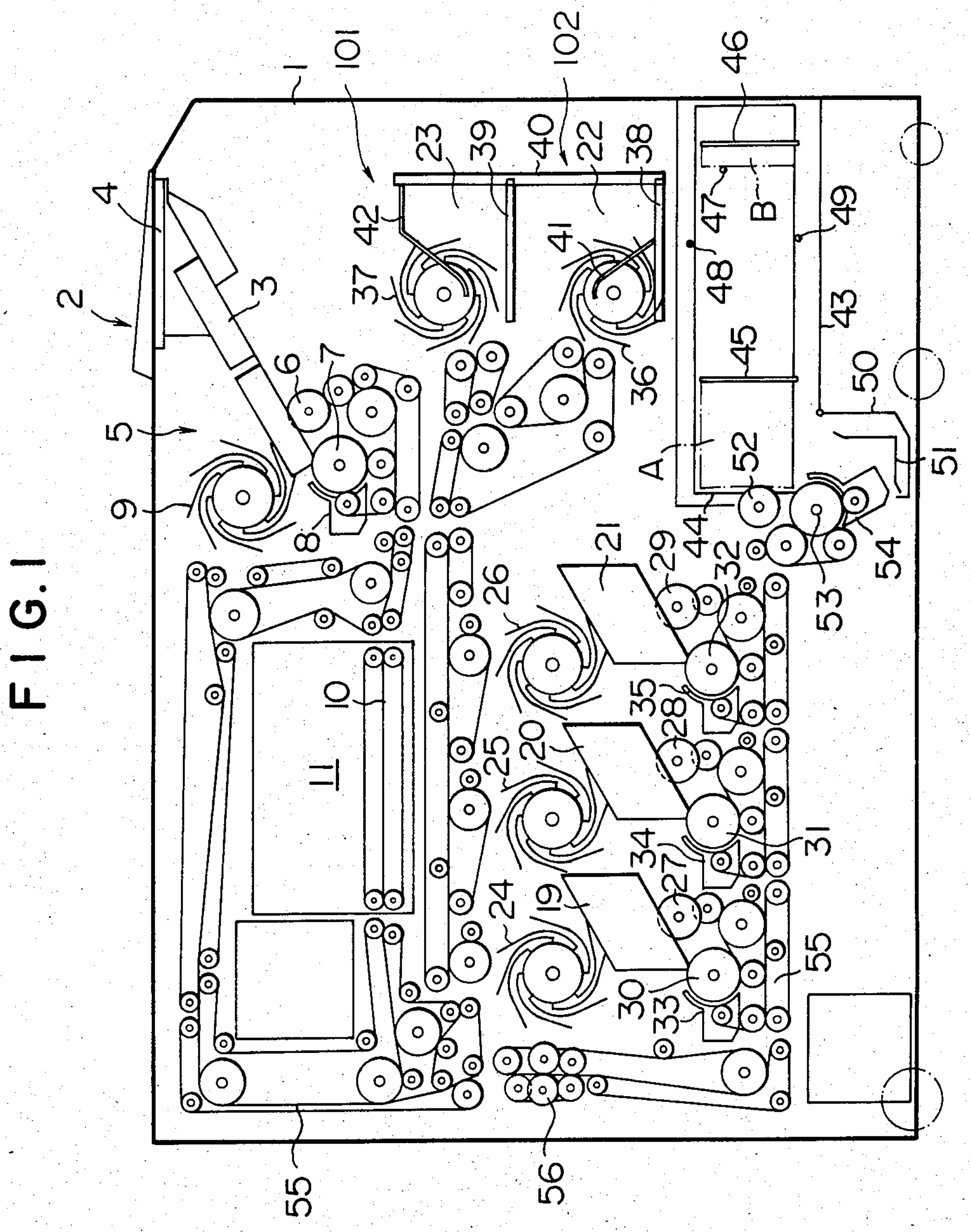
FIG. 1 is a schematic diagram illustrating one embodiment of a circulating-type bill depositing and disbursing machine for window use according to the present invention.
Figure 2:
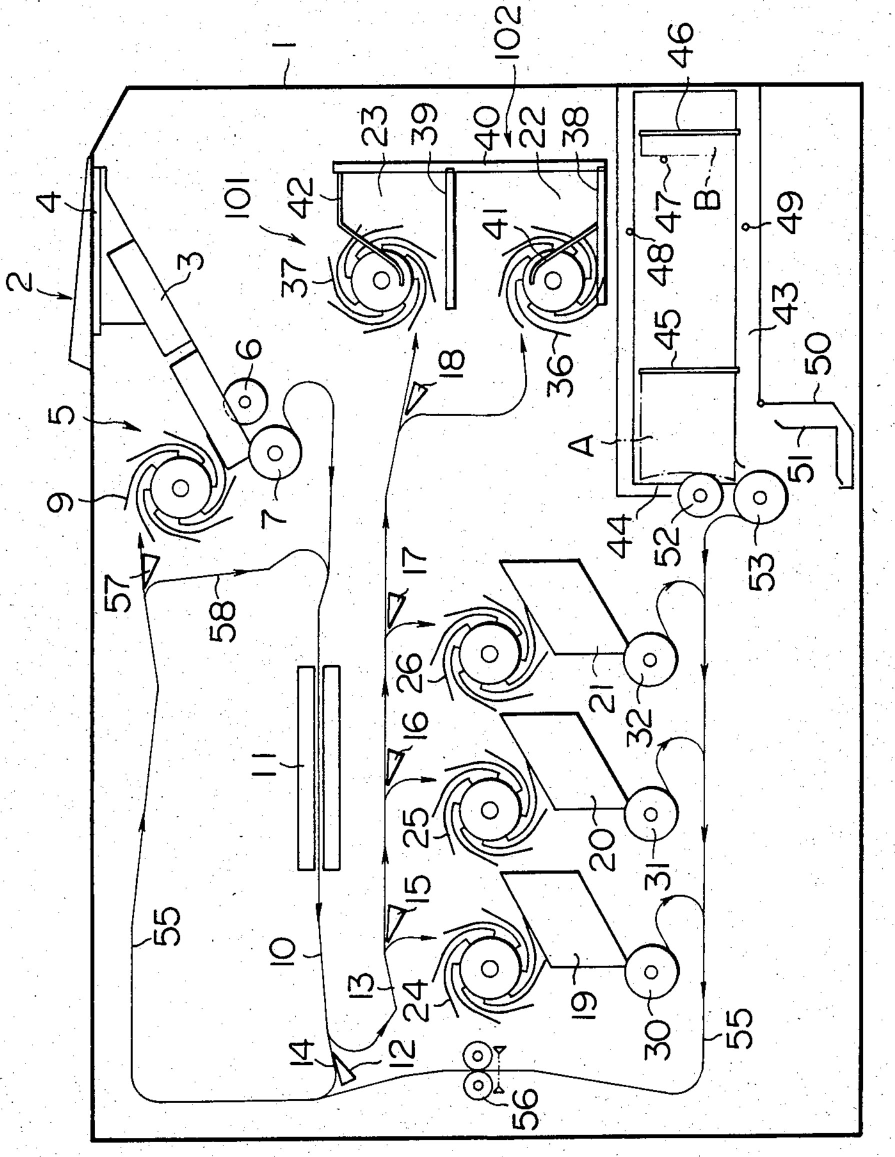
FIG. 2 is a route diagram explaining the flow of bills to and from the respective component elements shown in FIG. 1.
Figures 3A, 3B, 3C:
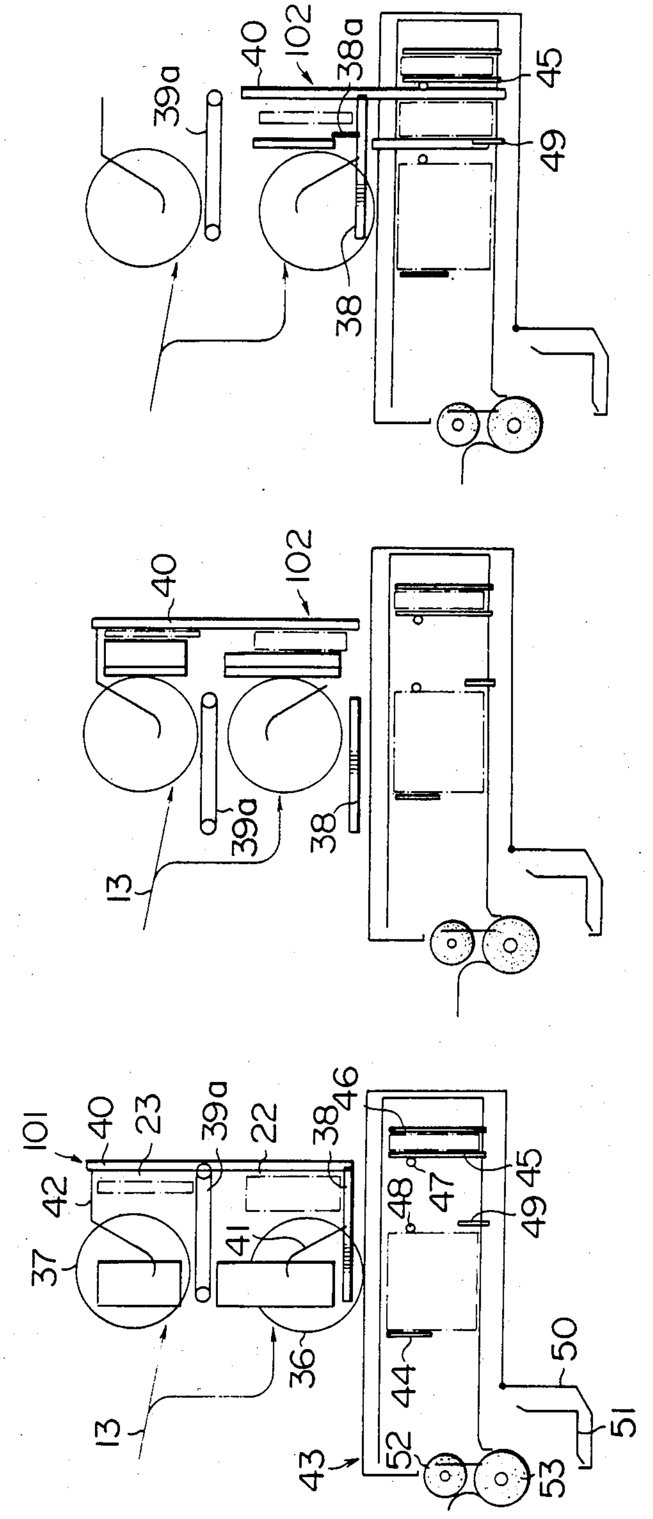
FIGS. 3 (A) to (F) are diagrams explaining the state of storage of bills in the case of the example shown in FIG. 1.
Figure 3F:
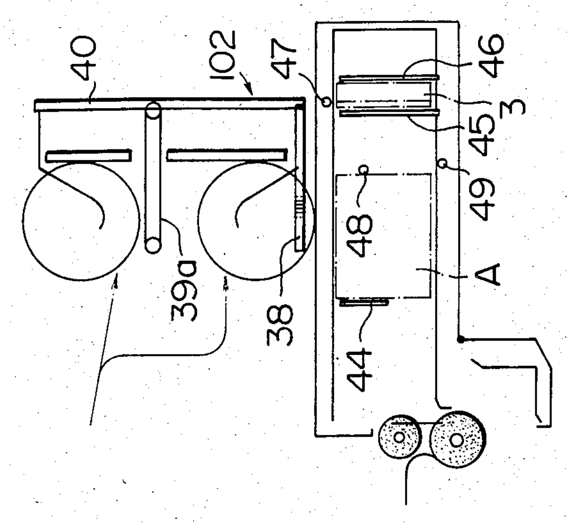
Figure 3E:
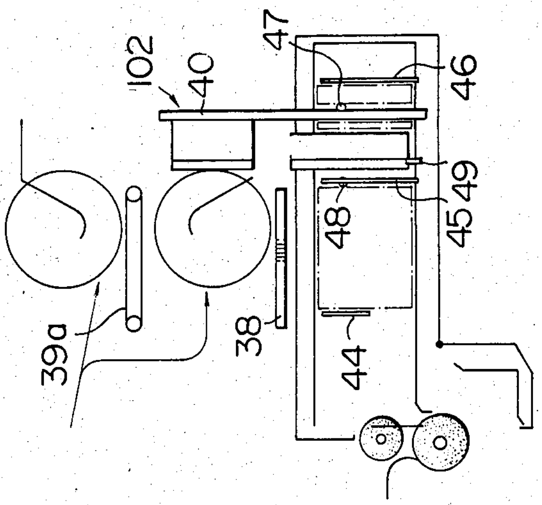
Figure 3D:
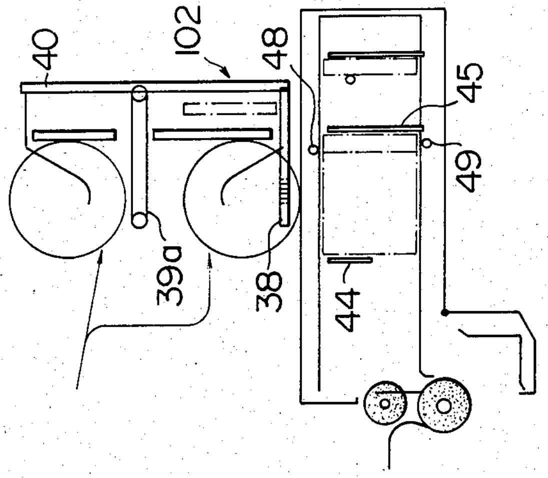

With reference to FIGS. 1 and 2, reference numeral 1 denotes a machine body of a circulating-type bill depositing and disbursing machine, and reference numeral 2 denotes a dealing port mechanism. This dealing port mechanism 2 comprises a depositing and disbursing bill storing section 3 for receiving bills to be deposited and for storing bills to be disbursed, a shutter 4 for opening and closing this depositing and disbursing bill storing section 3 from outside the machine body 1, and a dispensing and accumulating section 5 located at the rear of the depositing and disbursing bill storing section 3. This dispensing and accumulating section 5 is arranged such that it has a kickout roller 6, a feeding roller 7, and a friction-separating member 8 so that received bills sent from the depositing and disbursing bill storing section 3 can be conveyed by dispensing said bills one by one, and it also has an accumulating wheel 9 so that bills to be disbursed which has been conveyed from disbursing bill storing sections 19 to 21 for each type of bill, which will be described later, can be accumulated.

Additionally, the dealing port mechanism 2 is provided with the following: a partitioning member for partitioning the depositing and disbursing bill storing section 3 and the dispensing and accumulating section 5; a receiving and delivering mechanism for receiving bills to be deposited and delivering bills to be disbursed between the depositing and disbursing bill storing section 3 and the dispensing and accumulating section 5; and pressing pieces (not shown) which press received bills against the kickout roller 6 at the time of handling received bills and which separate from undelivered bills those bills which were not recognized as bills at a discriminating section 11, which will be explained later.

Received bills which are separated and conveyed by the dispensing and accumulating section 5 are conveyed by a discrimination route 10. The discriminating section 11 is provided midway in the discrimination route 10 and is adapted such that discrimination can be effected with regard to the genuineness of the bills being conveyed, their denomination, obverse and reverse sides, whether or not they are damaged, etc.

The discrimination route 10 in the latter part of the discriminating section 11 is divided into a distribution route 13 and a rejection route 14 by means of a distributing fork 12.

Distributing forks 15, 16, 17 and 18 are provided at four places along the distribution route 13. Bills distributed by the distributing forks 15 to 18 are respectively accumulated and stored in a disbursing bill storing part 19 for ¥10,000 bills, a disbursing bill storing part 20 for ¥5,000 bills, a disbursing bill storing part 21 for ¥1,000 bills, a first storing part 22 and a second storing part 23.

The rejection route 14 is connected to the midway section of a dispensing route 55, which will be described later, and this dispensing route 55 is connected to the accumulating car 9 of the dispensing and accumulating section 5.

The disbursing bill storing section 19 for ¥10,000 bills, the disbursing bill storing section 20 for ¥5,000 bills and the disbursing bill storing section 21 for ¥1,000 bills are respectively disposed horizontally and are arranged by combining accumulating wheels, 24, 25 and 26, kickout rollers 27, 28 and 29, feeding rollers 30, 31 and 32, and friction-separating members 33, 34 and 35, respectively, and the bills are accumulated in an inclined state.

The first storing part 22 and the second storing part 23 are disposed vertically on the terminal side of the distribution route 13 and are arranged by combining accumulating wheels 36 and 37, storing bottom plates 38 and 39, a storing front plate 40 (integrally formed), and guide plates 41 and 42.

The accumulating directions of the respective accumulating wheels of the first storing part 22 and the second storing part 23 are set in opposing directions. Bills fed in from above the accumulating wheel 36 of the first storing part 22 are accumulated in an upright state on the storing bottom plate 38 between the accumulating wheel 36 and the storing front plate 40 by means of the guide plate 41, while bills fed in from below the accumulating wheel 37 of the second accumulating part 23 are accumulated, in an upright state, in the direction opposite to that of the bills of the first bill storing part 22 on the storing bottom plate 39 between the accumulating wheel 37 and the storing front plate 40 by means of the guide plate 42.

Incidentally, it is desirable to provide a belt 39*a* (which will be described later) moving at least on the storing bottom plate 39 toward the storing front plate 40 side, so that the rear-end side of the accumulated bills will be fed positively to the storing front plate 40 side at the time when the bills are accumulated at the second storing part 23.

Next, description will be made of the depositing and disbursing box 43, which has a special bearing on the first and second storing parts 22 and 23. The arrangement of this depositing and disbursing box 43 is such that this box is disposed below the first and second storing parts 22 and 23 and is detachable with respect to the machine body 1. Further, an undamaged bill storing section A for storing undamaged bills in an upright state is provided in the front portion of the depositing and disbursing box 43 as seen from the mounting direction, and a damaged bill storing section B for storing damaged bills in an upright state is provided at the rear section thereof.

In other words, undamaged bills are clamped between a front plate 44 and a reciprocating plate 45, while damaged bills are clamped between a rear plate 46 and a transverse pair of damaged bill holding bars 47, 47, and the front plate 44, reciprocating plate 45, and rear plate 46 are supported such as to be horizontally movable, as will be explained later.

Incidentally, in the figures, reference numerals 48, 48 denote a transverse pair of undamaged bill holding bars at the time of storing undamaged and damaged bills, while reference numerals 49, 49 denote a transverse pair of temporary holding bars at the time of storing undamaged bills, the detailed overall description of which will be made later.

An openable cover 50 is openably provided in the front and lower portion of the depositing and disbursing box 43 as seen from the mounting direction. A front receiving plate 51 with an L-shaped section for receiving undamaged bills to be stored is provided in this openable cover 50.

Furthermore, a kick-out roller 52, a feeding roller 53, and a friction-separating member 54, which can be engaged with the depositing and disbursing box 43 and can pay out and feed undamaged bills inside the box 43 at the time of mounting the box 43, are provided in said front and lower portion of the depositing and disbursing box 43 as seen from the mounting direction and in a state wherein they are supported by the machine body 1.

The bills which are separated and fed out one by one from the respective disbursing bill storing parts 19, 20 and 21 and the depositing and disbursing box 43 are conveyed by the dispensing route 55. A disbursing bill feed discriminating part 56 is provided midway along the dispensing route 55 and is adapted to be capable of judging any abnormality in the feeding of bills being conveyed (double feed, longitudinal feed, and proximity feed and the like).

The latter section of the rejection route 14 joins and is connected to the latter section of the dispensing route 55 following the disbursing bill feed discriminating part 56, and this dispensing route 55 is connected to the accumulating car 9 of the dispensing and accumulating section 5.

Also, a transfer route 58 for transferring bills to the discrimination route 10 in the first portion of the discriminating section 11 by means of a distributing fork 57 branches out and is connected to the vicinity of the rear end of this dispensing route 55.

The first and second storing parts 22 and 23 are arranged such as to be capable of storing bills by means of a pool mechanism, which will be described later, and is organically coupled with a storing mechanism 102 and the like. The detailed description of these component parts will be made hereafter with reference to FIGS. 3 through 15.

First, detailed description will be made of the pool mechanism 101. The pool mechanism 101 has the following: accumulating wheels 36 and 37 for receiving undamaged or damaged bills fed in from the distribution route 13 via the distributing fork 18; the storing front plate 40 and the guide plates 41 and 42 for setting accumulated bills in an upright state; and the storage bottom plates 38 and 39 for supporting the lower surfaces of undamaged and damaged bills in an upright state. At the same time, the guiding-in car 103 for preventing damaged bills being rotated and conveyed from dropping is provided in the accumulating wheel 37 so as to effectively execute the reverse accumulation in the second storing part 23.

Figure 6:
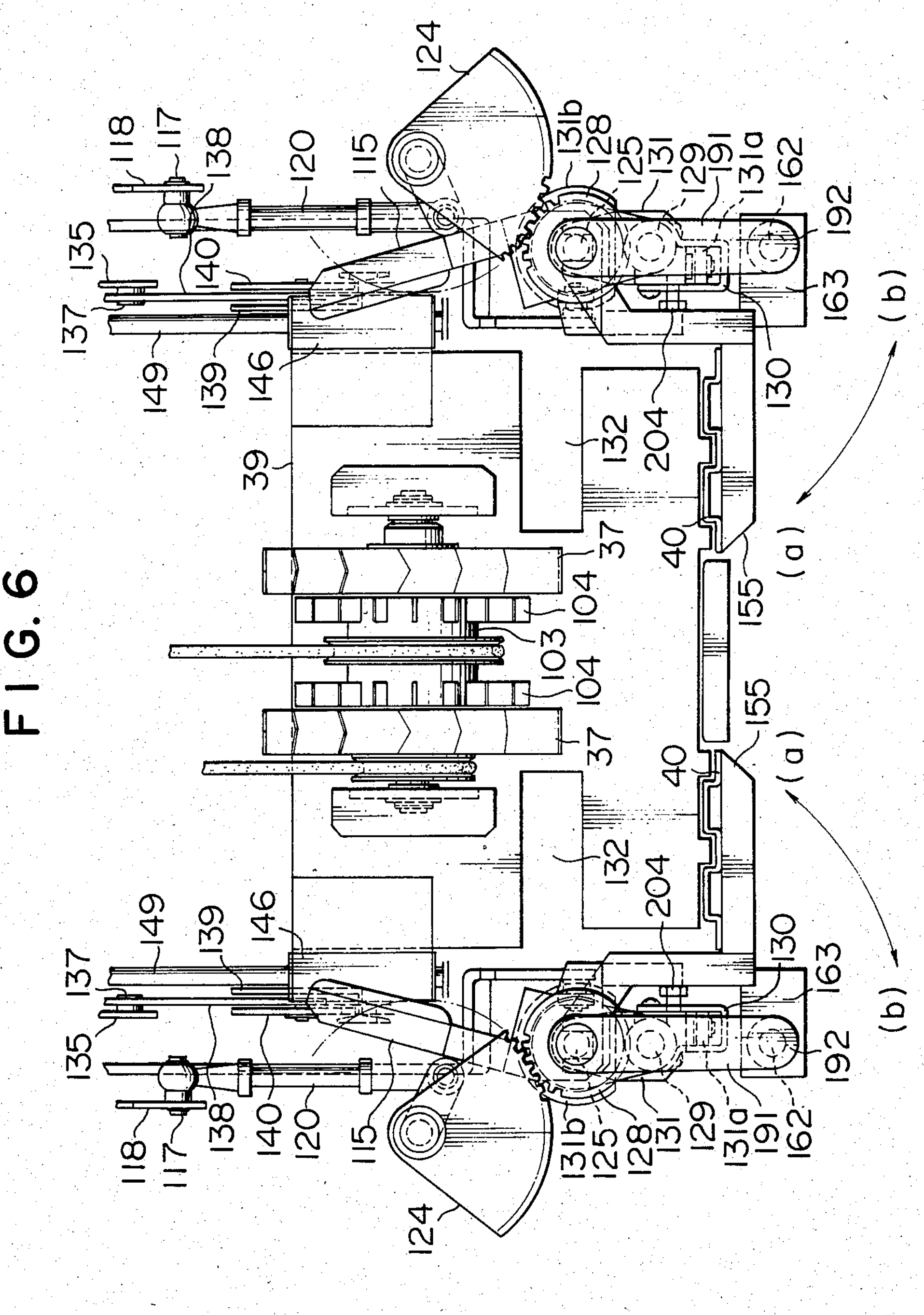
FIG. 6 is a top plan view of the second storing part.
Figure 7A:
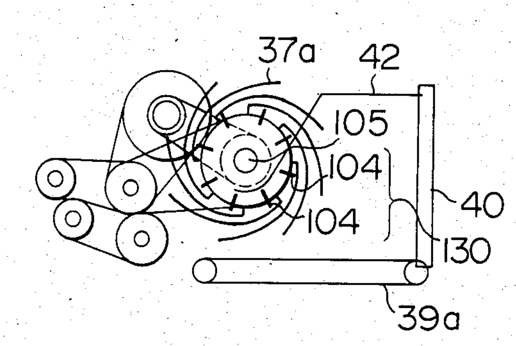
FIGS. 7 (A) to (D) are diagrams explaining the guiding-in wheel of the accumulating wheel in the first and second storing parts.
Figure 7B:
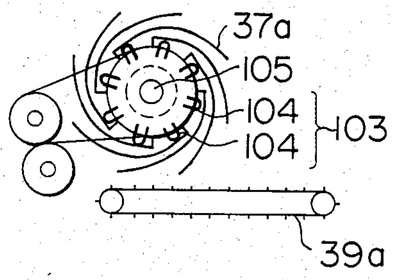
Figure 7C:
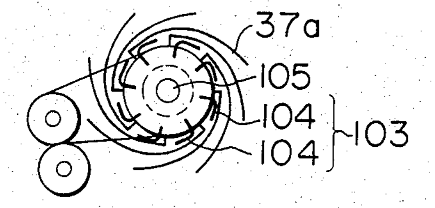
Figure 7D:
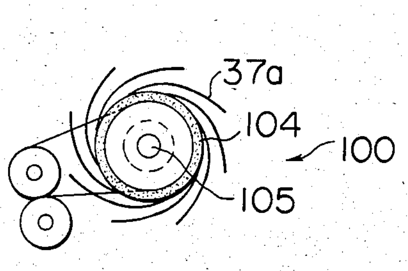
Figure 8:
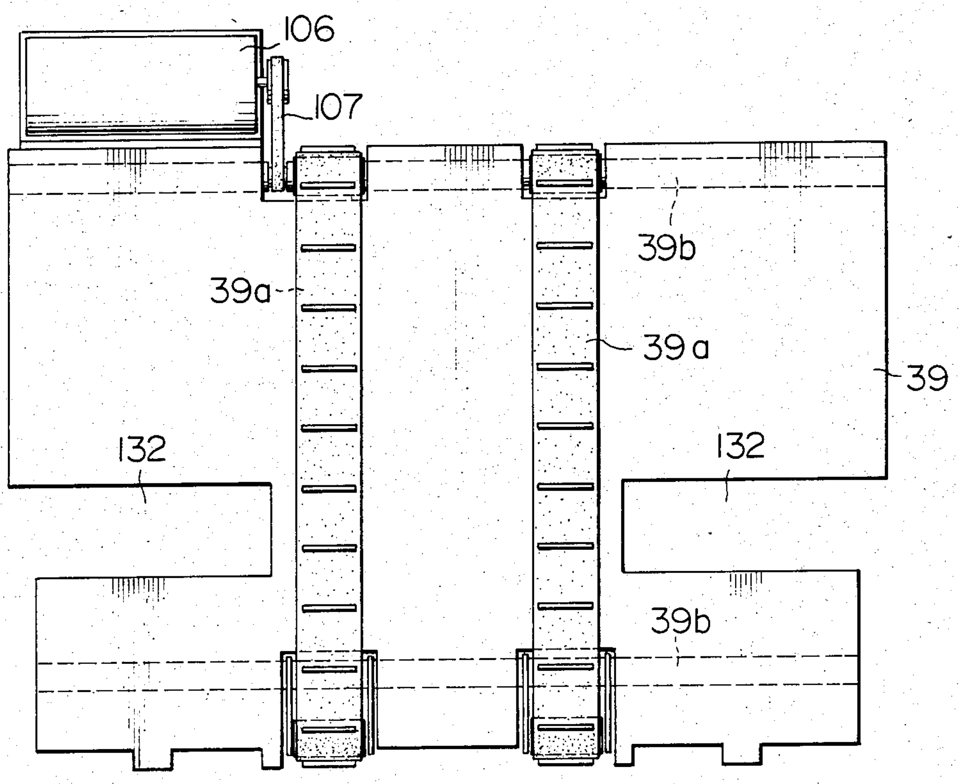
FIG. 8 is a top plan view of the second storing bottom plate.

This guiding-in car 103 is arranged such that, as illustrated in FIGS. 6 and 7 (A) to (D), frictional members 104 coming into contact with the surfaces of bills and made of such material as rubber and sponge are provided around its periphery in the shape of a plate, loop, saucer, ring, or the like, and rotate faster than the blades *37a* of the accumulating wheel 37 with the central shaft 105 of the accumulating wheel 37 as their center. Because of this setting, bills placed between the adjacent blades *37a* and *37a* are moved in the rotating direction as they come into contact with the frictional members 104, and are guided in up to the roots of the blades *37a*. The bills thus guided in are scraped off by the guide plate 42 and are accumulated on the storage bottom plate 39 in an upright state. Incidentally, the auxiliary belts *39a* for driving the bills in the front direction of the machine body 1 during operation are provided on both sides of the storage bottom plate 39. This auxiliary belt *39a* is trained between a pair of shafts *39b*, *39b* provided along the storage bottom plate 39, as shown in FIG. 8, and it is driven by a transmission belt 107 at the time when a small motor 106 provided at the rear portion of the storage bottom plate 39 is operated, so as to support the rear end portions of bills and prevent them from falling from the accumulating wheel 37 when the striking in is insufficient.

Next, description will be made of the storing mechanism 102. The storing mechanism 102 comprises the following: a clamp device 108 for clamping bills in an upright state; the storage bottom plate moving device 109 for retracting at the time of moving the bills in a clamped state toward the depositing and disbursing box 43 so as to clear its passage; and the arm lifting device 110 coupled with a clamp arm 115 and a front plate arm 155, which will be described later; and the swinging and rotating device 111 for the openable plate 165 of a notch 132 and a bill holding bar 166.

Figure 4:
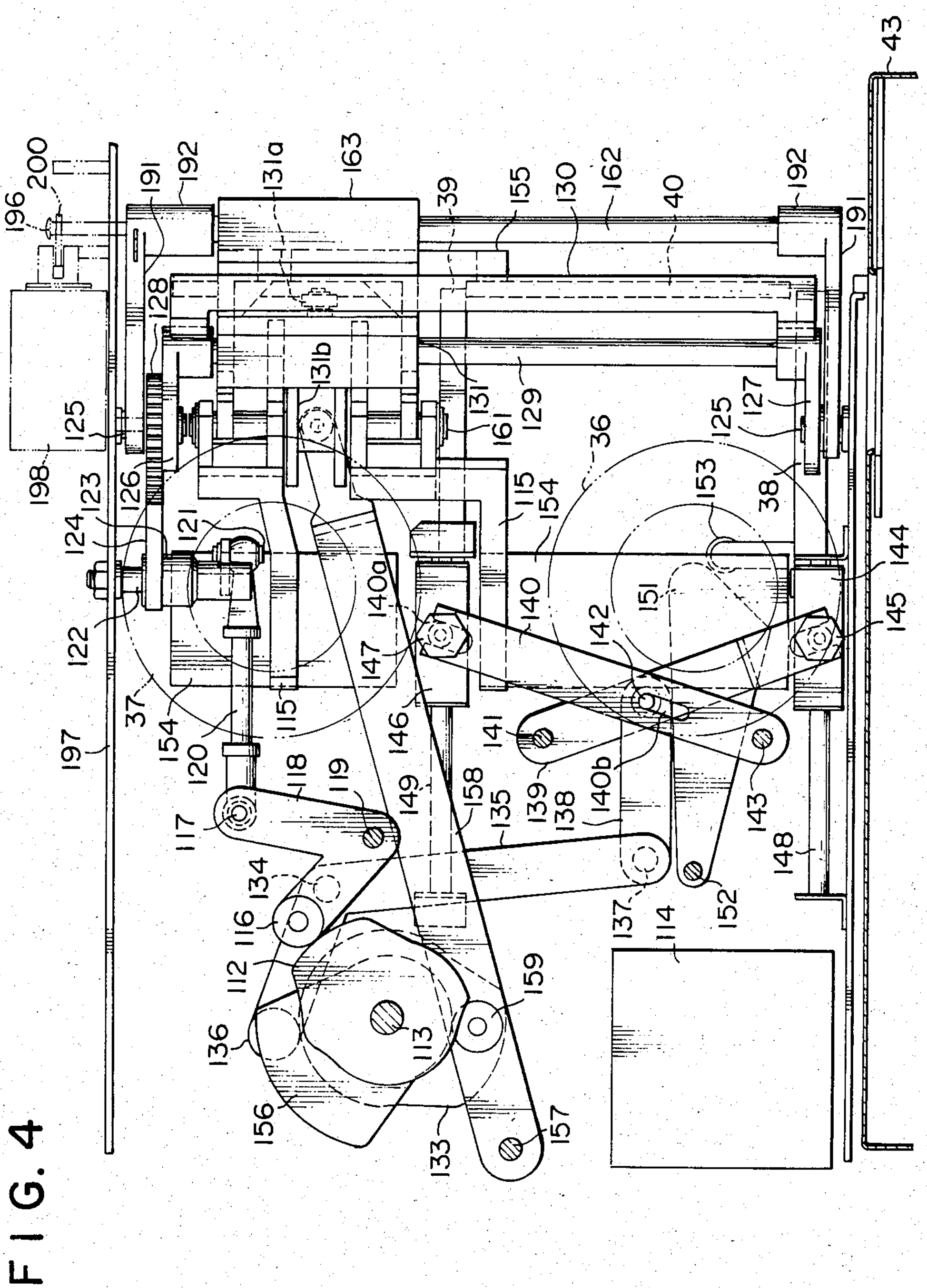
FIG. 4 is a side elevational view of the first and second storing parts.
Figure 5:
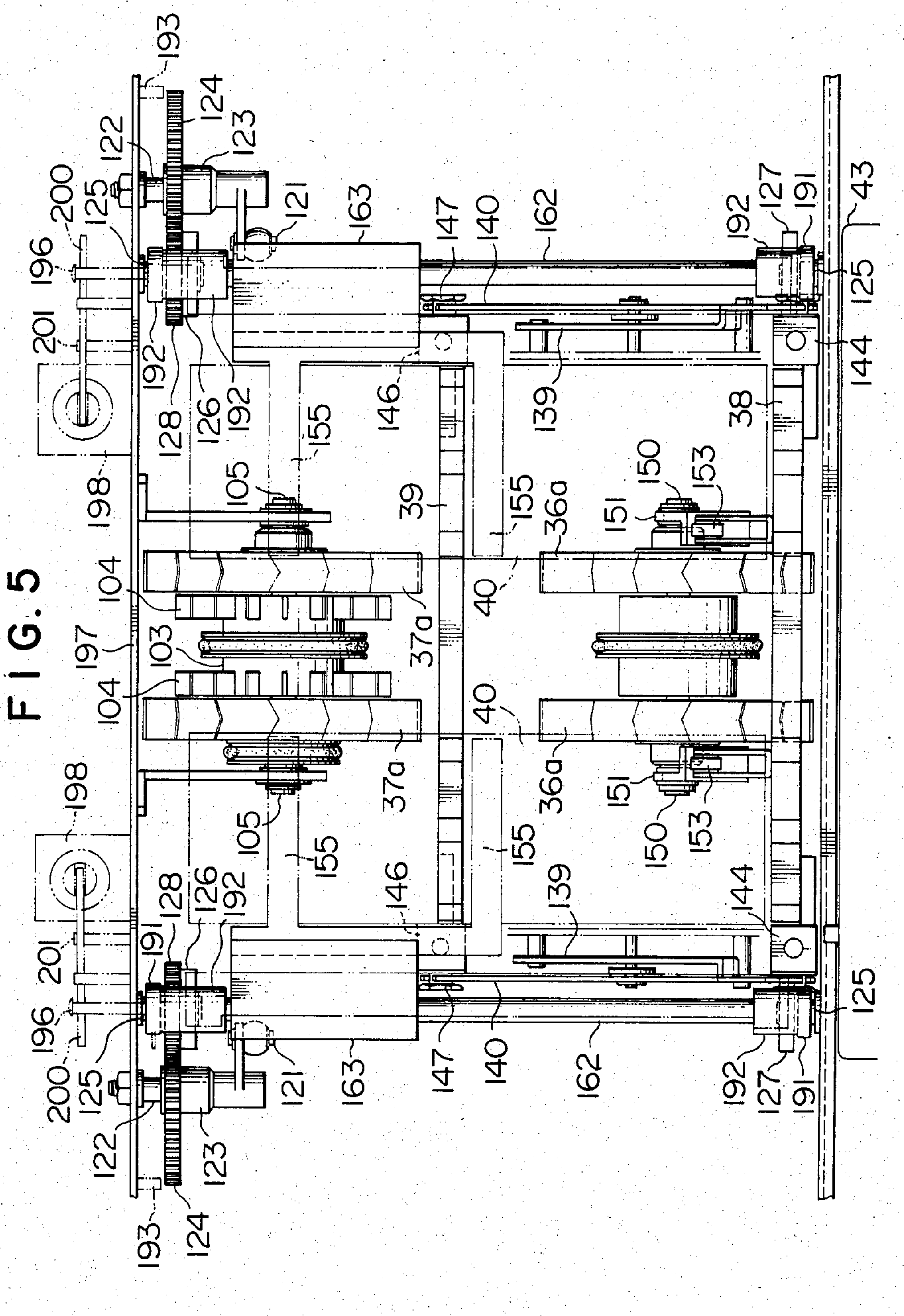
FIG. 5 is a front elevational view of the first and second storing parts.
Figure 9A:
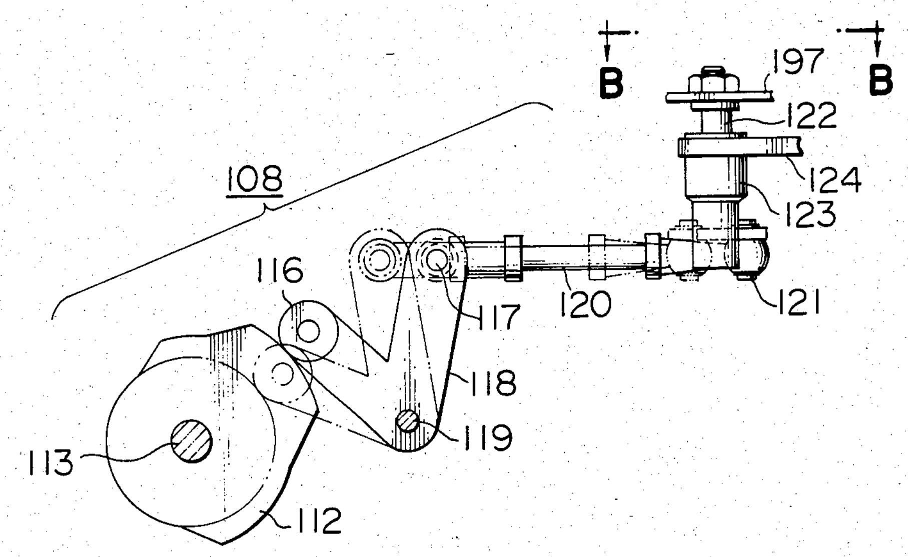
FIGS. 9 (A) and 9 (B) are views taken along the line B—B of FIG. 8 in the direction of the arrow.
Figure 9B:
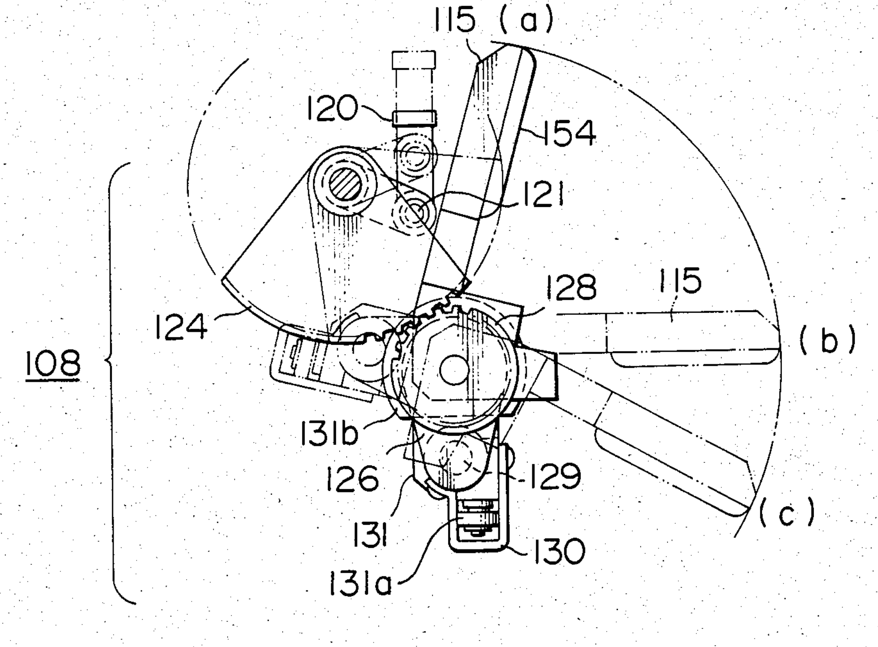
Figure 10:
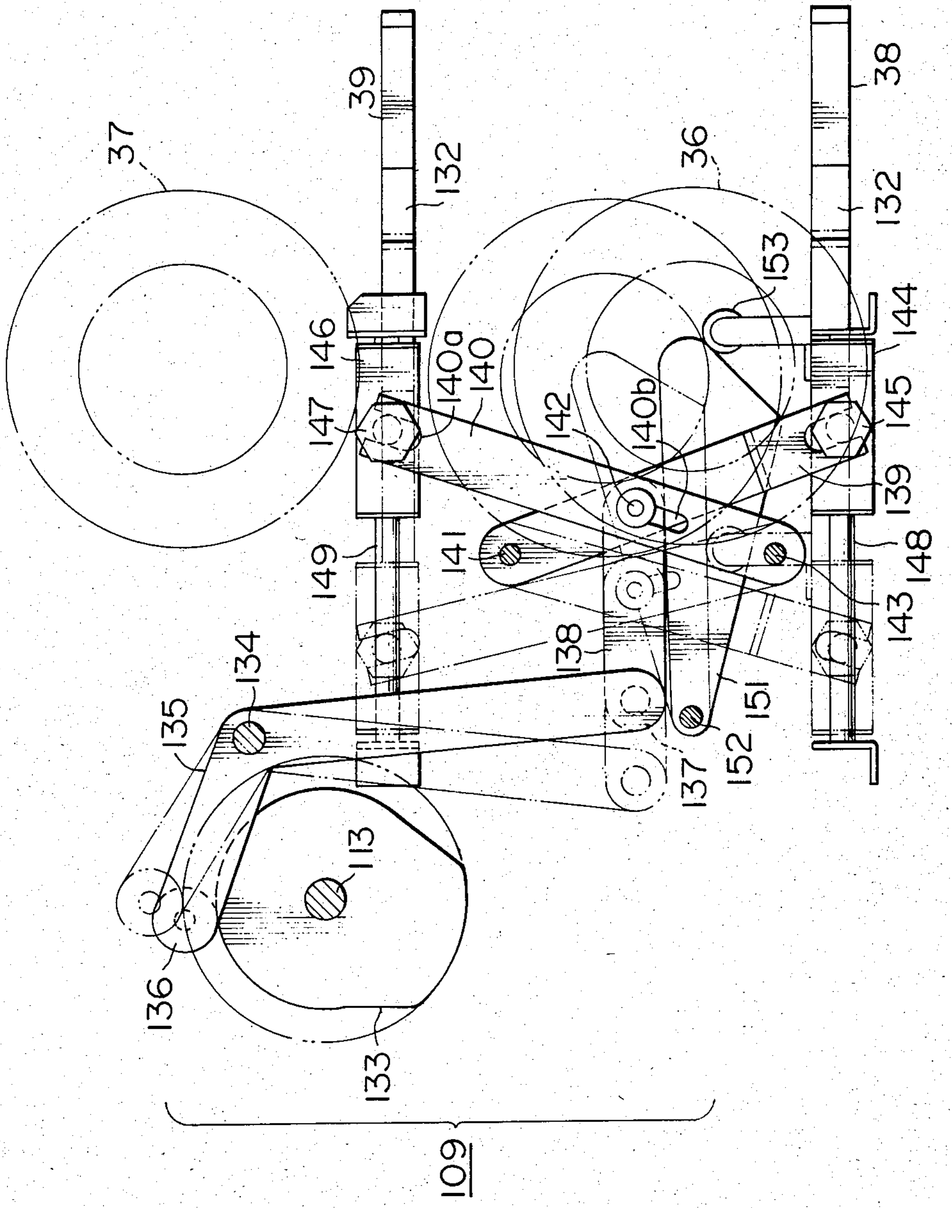
FIG. 10 is a diagram explaining the operation of the storage bottom plate moving device.
Figure 11:
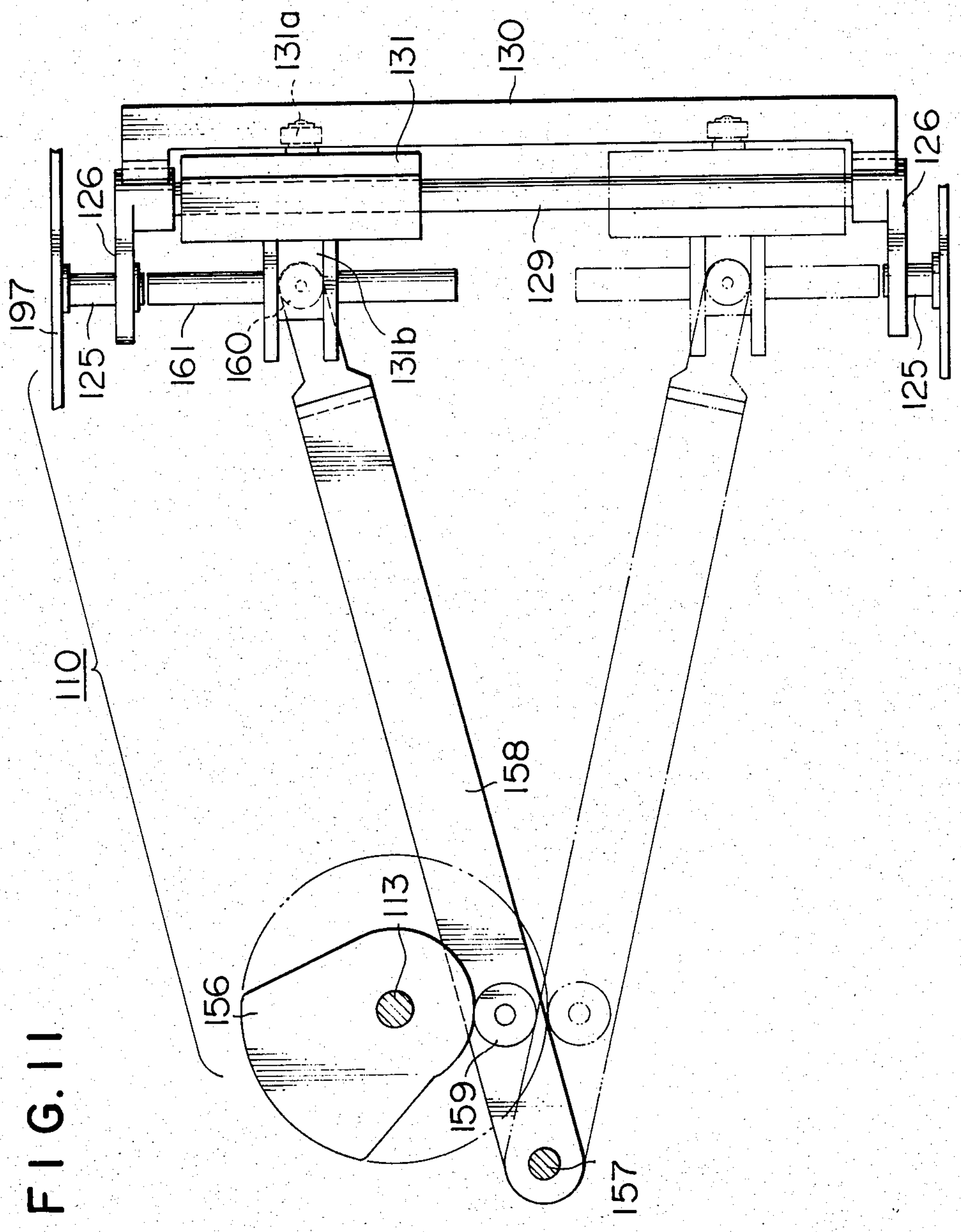
FIG. 11 is a diagram explaining the operation of the clamp arm and the front plate arm lifting device.

In other words, as shown in FIG. 9 (also refer to FIGS. 4 and 6), a cam 112 is rotated by a motor 114 about a shaft 113 so as to control the swinging of the clamp arm 115. A V-shaped link 118 having a cam head 116 and a coupling shaft 117 is rotatably provided on a shaft 119. A linking bar 120 is coupled with a coupling shaft 117, and a gear supporting member 123 rotated about a shaft 122 is coupled with the shaft 121 of the end thereof. A fan-shaped gear 124 is supported integrally by this gear supporting member 123. In a position slightly offset from the rotating center of this fan-shaped gear 124 are provided an upper arm 126 and a lower arm 127 spaced vertically or coaxially apart from each other with the two shafts 125 as their center, as shown in FIGS. 4, 5, and 11, respectively. At the same time, a gear 128 is provided integrally with the upper arm 126 and is engaged with the fan-shaped gear 124. In addition, a coupling shaft 129 is provided between the upper and lower arms 126 and 127, and these are coupled integrally. Furthermore, the upper arm 126 and lower arm 127, together with the coupling shaft 129, are provided in pairs on both sides of the first and second storing parts 22 and 23. Moreover, a vertically spanning guide rail 130 is provided integrally with the upper and lower arms 126 and 127, a vertically slidable arm supporting member 131 is provided on the coupling shaft 129, and a guide roller 131a thereof is adapted to engage with the guide rail 130 and slide vertically along the coupling shaft 129. The arm shaft receiving part *131b* of the arm supporting member 131 securely supports a shaft 161, as will be mentioned later.

The rotation of the aforementioned fan-shaped gear 124 causes the lower arm 127 to rotate outwardly with respect to the first and second storing parts 22 and 23 about the shaft 125 and the clamp arm 115 toward the storing parts 22 and 23. The rotating movement of the clamp arm 115 is of the three-stage type, its positions being indicated by (a), (b), and (c) in FIG. 9 B, and is set such that at the position of (b) the clamp arm 115 can pass through the notches 132 provided in the storage bottom plates 38 and 39.

Incidentally, as for the clamp device 108, the same devices are provided independently on both sides of the storing parts 22 and 23, respectively, and the rotating movement of the clamp arms 115 on both sides is synchronized.

Next, description will be made of the storage bottom plate moving device 109. As for the storage bottom plate moving device 109, a cam 133 rotated about the shaft 113 and using the motor 114 as its driving source controls the storage bottom plates 38 and 39, as in the case of the aforementioned clamp arm moving device 108.

In other words, as shown in FIG. 4, the cam 133 rotated about the shaft 113, which shaft was described in regard to the clamp device 108, drives the cam head 136 of a link 135 which is L-shaped and is disposed to be rotated about the shaft 134. The movement of this link 135 is converted to the transverse movement of a link 138 via a coupling shaft 137. To this link 138 are connected a link 139 at the rear side thereof and a link 140 on the front side thereof. The rotation of the link 139 about a shaft 141 is converted to the swinging movement of the link 140 about a shaft 143 via the long hole *140b* of the coupling shaft 142 and the link 140. Additionally, a long groove *139a* is formed at the tip of the link 139 and gently clamps a coupling shaft 145 on a first conveyor block 144. Furthermore, a long groove *140a* is formed at the tip of the link 140, and gently clamps a coupling shaft 147 on a second conveyor block.

As shown in FIG. 5, the transverse movement of the storage bottom plate 38 of the first storing part 22 is checked by a pair of first conveyor blocks 144, said first conveyor blocks being supported slidably by a horizontally spanning shaft 148.

Meanwhile, the transverse movement of the storage bottom plate 39 of the second storing part 23 is also checked by the second conveyor block 146, and is supported slidably by a horizontally spanning shaft 149.

Incidentally, as for the storage bottom plate moving device 109, the same devices are provided on both sides independently, respectively, and the devices on both sides are operated synchronously.

In addition, as shown in FIGS. 4 and 5, the accumulating wheel 36 of the first storing part 22 is arranged such that the shaft 150 of its rotating center is supported by an accumulating wheel supporting plate 151, which is supported rotatably by a shaft 152.

Immediately below this accumulating car supporting plate 151 and above the storage bottom plate 38, a push-up roller 153 for rotating the accumulating wheel supporting plate 151 at the time of the retraction of the storage bottom plate 38 is provided on the latter. Thus, as the accumulating wheel 36 is raised in conjunction with the retraction of the storage bottom plate 38, it becomes possible to reduce the vertical dimension. At the same time, the accumulation of bills by means of the accumulating wheel 36 can be effectively carried out, and unnecessary collision between the storage bottom plate 38 and the accumulating wheel 36 can be avoided. In addition, after bills accumulated in an upright state on the storage bottom plates 38 and 39 of the first and second storing parts 22 and 23 are clamped between a holding plate 154 and the storing front plate 40, both the storage bottom plates retract, and the clamp arm 115 and the front plate arm 155 are then lowered to feed the clamped bills into the depositing and disbursing box 43.

Next, description will be made of the arm lifting device 110 for vertically driving the clamp arm 115 and the front plate arm 155 with reference to FIG. 11.

As a cam 156, shown in FIG. 4 and so forth, is rotated by means of the shaft 113 coupled with the motor 114, a cam head 159 rotated about a shaft 157 is driven, and a guide roller 160 at the tip of a link 158 vertically moves the arm supporting member 131 via the arm shaft receiving part **131*b*. Incidentally, the arm shaft receiving part 1341*b* is arranged such as to be capable of gently supporting the guide roller 160 even when the arm shaft supporting part 131*b*** rotates so as to clamp bills.

Thus, as the rotational movement of the link 158 is converted to vertical movement by means of the arm shaft receiving part **131*b*, lifting and lowering movement is synchronously effected by the clamp arm 115 and the shaft 161 securely supported by the arm shaft receiving part 131*b*, the holding plate 154 secured to the clamp arm 115, the front plate arm 155 rotatably supported by the shaft 161, and the storing front plate 40 integral with the front plate arm 155**.

Incidentally, restriction of the clamp arm 155 and the front plate arm 155 to the lifting and lowering movement alone is effected by the arm supporting member 131 which is slidably supported by the coupling shaft 129 and secures the arm shaft receiving part **131*b*, as well as an arm securing member 163 which is slidably supported by a shaft 162 and is integral with the front plate arm 156. At the same time, the reason why the shaft 161 is able to maintain constantly the same central position as that of the shaft 125 even when the shaft 161 is being raised or lowered is that the guide roller 131*a* which is integral with the arm supporting member 131 is adapted such as to follow the guide rail 130 integrally formed with the upper and lower arms 126 and 127. Thanks to this guide rail 130, the arm lifting device 110** is able to effect lifting and lowering movement in an accurate position.

Furthermore, when the bills accumulated in the first and second storing parts 22 and 23 are fed into the depositing and disbursing box 43, the lifting and lowering movement of the clamp arm 115 and the front plate arm 155 is carried out twice.

First, the bills accumulated in the first storing part 22 are fed into the depositing and disbursing box 43 as the clamp arm 115 and the front plate arm 155 are lowered on the first occasion. At this juncture, the holding plate 154 and the storing front plate 40 clamping the bills accumulated in the first storing part 22 enter the depositing and disbursing box 43, while the holding plate 154 and the storing front plate 40 clamping the bills accumulated in the second storing part 23 are lowered to the first storing part 22 [refer to FIG. 3 (C)].

Next, the retracted storage bottom plates 38 and 39 of the first and second storing parts 22 and 23 advance and block the bottoms of the storing parts 22 and 23 again. Then, the clamp arm 115 rotates to the position (b) shown in FIG. 9 (B) and releases the bills. In other words, the bills accumulated in the first storing part 22 are released in the depositing and disbursing box 43, and the bills accumulated in the second storing part 23 are released on the storage bottom plate 38 of the first storing part 22. The aforementioned clamp arm is raised to the position (b) shown in FIG. 9 (B) together with the front plate arm 155 and then returns to its stand-by position. At this juncture, the clamp arm 115 passes through the notches 132 provided in both the storage bottom plates 38 and 39 and returns to its original position. After it has returned to its original position, the clamp arm 115 rotates again from the position (b) shown in FIG. 9 (B) so as to press the bills to the side of the storing front plate 40. At this juncture, the holding plate 40 holds the bills accumulated in the second storing part 23, and the bills accumulated in the second storing part 23 are conveyed to the first storing part 22, with the result that the second storing part becomes empty. Incidentally, the arm lifting devices are provided independently on both sides of the storing parts 22 and 23, and both of the devices move synchronously.

Next, the storage bottom plates 38 and 39 retract again, the clamp arm 115 and the front plate arm 155 are lowered as in the case of the aforementioned operation, and the holding plate 154 of the first storing part 22 and the storing front plate 40 enter the depositing and disbursing box 43. The clamp arm 115 rotates again to the position (b) shown in FIG. 9 (B) and releases the bills. When the bills are released, the clamp arm 115 is raised again to the position (b) shown in FIG. 9 (B) together with the front plate arm 155. The clamp arm 115, as in the aforementioned operation, passes through the notches 132 of the storage bottom plates 38 and 39 which cover the bottoms of the storing parts 22 and 23 and returns to its stand-by position. Then, the clamp arm 115 rotates to the position (b) shown in FIG. 9 (B) and is set on stand-by for the next storing instruction.

Next, description will be made of the swinging and rotating device 111 with reference to FIG. 12.

A cam 164 controls the rotation of an openable plate 165 and a bill holding bar 166 by means of the rotation of the shaft 113 coupled with the aforementioned motor 114. In other words, with the rotation of the cam 164, the cam head 169 of a link 168 is driven with a shaft 167 as its rotating center, and a long groove **168*a*** at the tip of the link 168 drives a coupling shaft 171 secured to a link 170. The link 170 is allowed to move only vertically by means of shafts 172 and 173, and the portions of the link 170 supported by the shafts 172 and 173 are formed as vertically long holes 174 and 175 so as to make the link 170 slidable. At the tip of the link 170, there is provided a rotating lever 176 which is pressed and driven only when the storage bottom plate 38 of the first storing part 22 covers the bottom of the first storing part 22. A gear 177 is integrally secured to this rotating lever 176, and this gear 177 engages with a gear 178, which is also engaged with a gear 180 secured to one end of a shaft 179.

Figure 13:
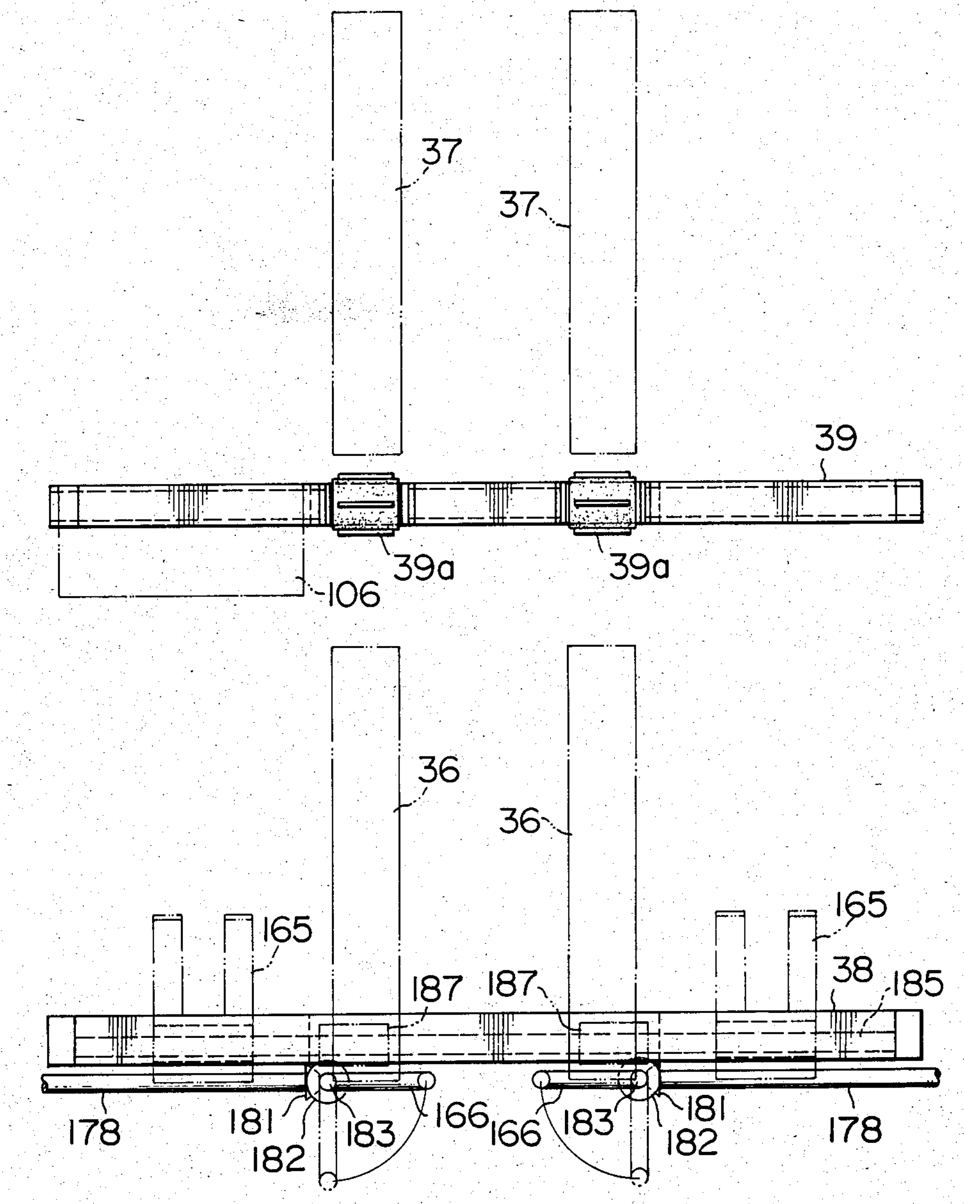
FIG. 13 is a front elevational view of the portion shown in FIG. 12.
Figure 14:
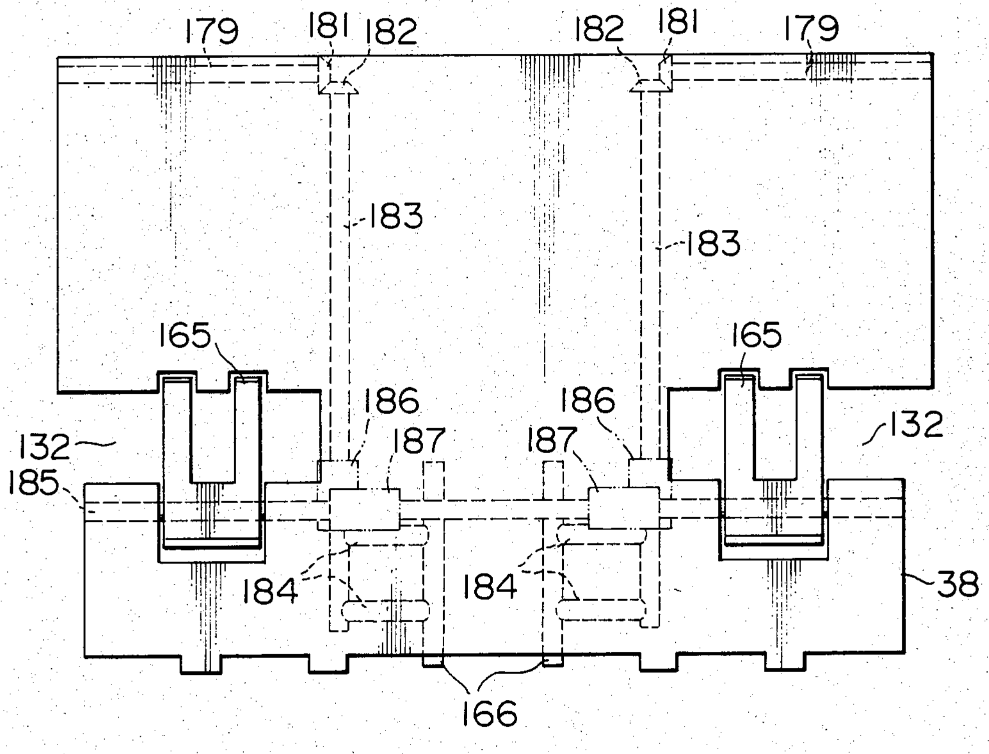
FIG. 14 is a top plan view of the first storage bottom plate.

The shaft 179 has a bevel gear 181 at the other end thereof, as shown in FIG. 13, and a shaft 183, which has at one end thereof a bevel gear 182 which engages with said bevel gear 181, extends at right angles with the shaft 179. Coupling bars 184, which extend from the tip of the shaft 183 at right angles therewith, secure the bill holding bar 166.

In addition, the openable plate 165 is rotatably supported by a shaft 185 above the storage bottom plate 22. The arrangement is such that a worm 186 and a worm wheel 187 are engaged with each other at a portion where the shaft 183 and the shaft 185 intersect each other at right angles.

This swinging and rotating device 111 operates at the time when the clamp arm 115 is lowered, feeds out the bills into the depositing and disbursing box 43, and is raised to its original position. The openable plate 165 normally covers the notch 132 and prevents the accumulated bills from entering the notch 132, and, during operation, stands erect and opens the notch 132 so as to allow the passing of the clamp arm 115 therethrough.

The aforementioned bill holding bar 166 is normally situated horizontally. During operation, however, the bill holding bar 166 faces downward and is set to be vertical, and at the time when the clamp arm 115 and the front plate arm 155 feed and release bills into the depositing and disbursing box 43 and are lifted, the bill holding bar 166 comes into frictional contact with the holding plate 154 and the storing front plate 40, thereby holding the bills that rise together with the holding platge 154 and the storing front plate 40 so as to retain the bills inside the depositing and disbursing box 43.

Figure 12:
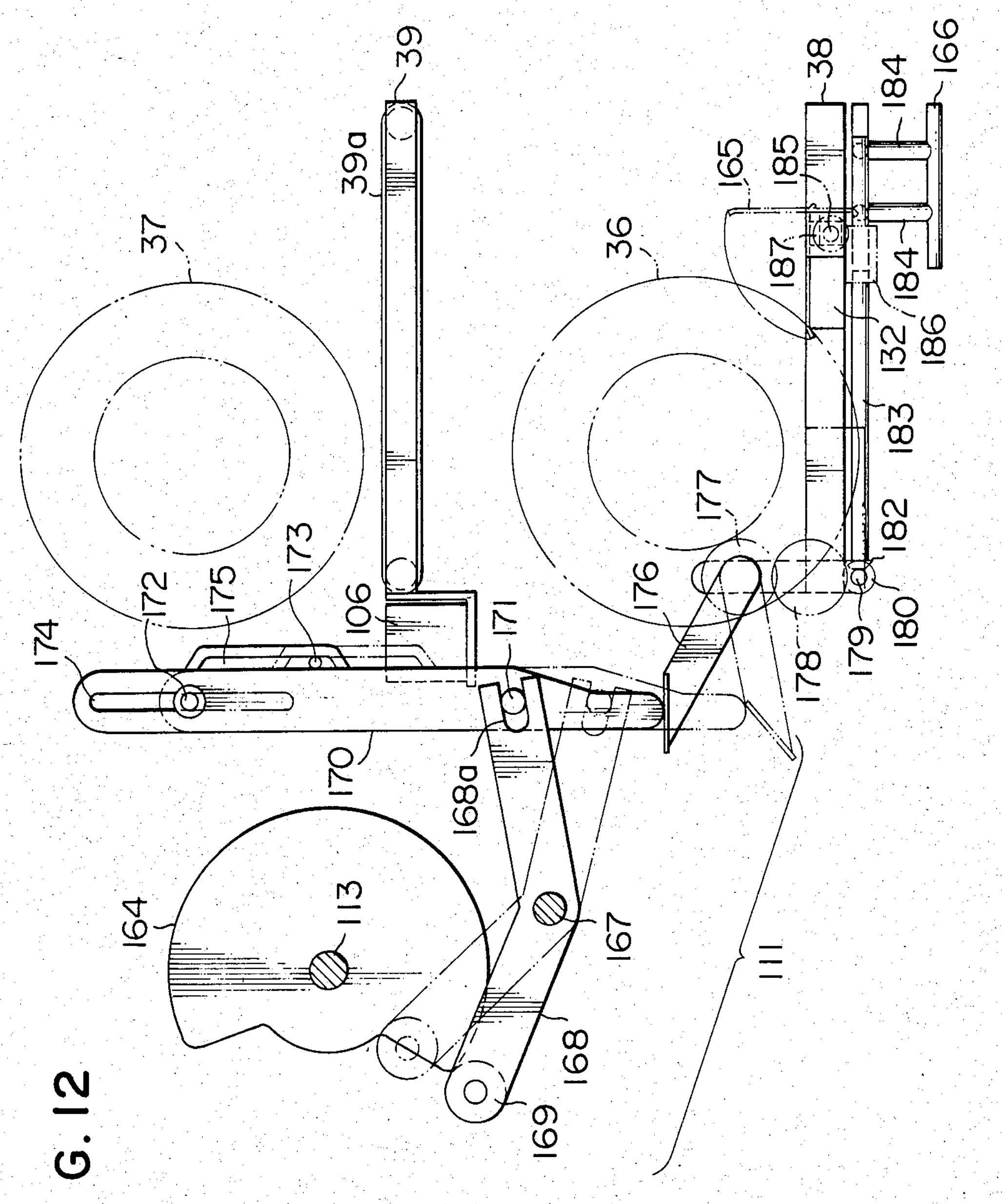
FIG. 12 is a diagram explaining the operation of the notch opening and closing plate and the bill holding bar rotating device.

In other words, in FIG. 12, as the link 170 depresses the rotating lever 176 by the operation of the link 168, the gear 177 integral with the rotating lever 176 rotates counterclockwise as viewed in FIG. 12, while the gear 178 rotates clockwise and the gear 180 engaging with the gear 178 counterclockwise. As this gear 180 rotates, the shaft 179 rotates counterclockwise as in the case of the gear 180, and in conjunction with it the shaft 183 rotates clockwise. As the shaft 183 rotates clockwise, the bill holding bar 166 is rotated to its downward vertical position and the openable plate 165 to its upward vertical position, respectively. In the examples shown in FIGS. 12 and 14, although the openable plate 165 is provided for the notch 132 of the storage bottom plate 38 of the first storing part 22, the openable plate 165 is similarly provided to the notch 132 of the second storing part 23 as well. Additionally, the swinging and rotating devices 111 for the openable plate 165 for the notch 132 and the bill holding bar 166 are provided independently on both sides of the storing parts 22 and 23 by clamping the same, and the swinging and rotating devices 111 on both sides operate synchronously.

Next, description will be made of a case where received bills are returned to the dealing port mechanism 2.

If an instruction for return is issued at the time when bills are accumulated on the storage bottom plate 38 of the first storing part 22 and the storage bottom plate 39 of the second storing part 23, the clamp arm 115 rotates to the position (b) shown in FIG. 9. (B). Then, as the front plate arm 155 rotates outwardly with respect to the storing parts 22 and 23, the front plate arm 155 releases the accumulated bills toward the front of the machine body 1. Then, the teller opens the return door (not shown) provided on the front side of the machine body 1 and takes out the bills to be returned in the first and second storing parts 22 and 23.

Figure 15A:
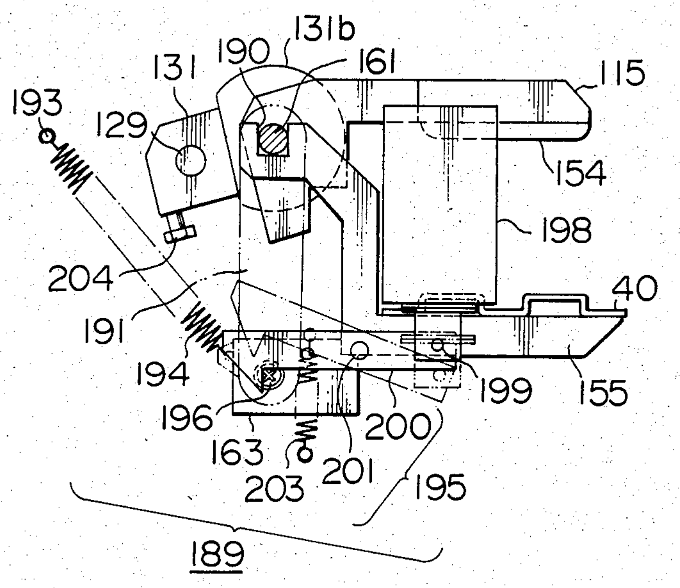
FIGS. 15 (A) to (C) are diagrams explaining the operation of the front plate arm opening and closing device.
Figure 15B:
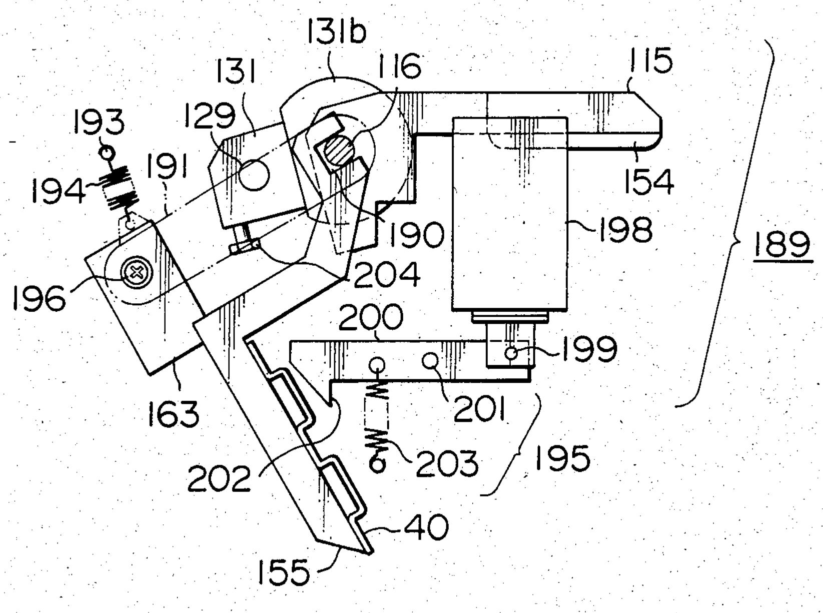
Figure 15C:
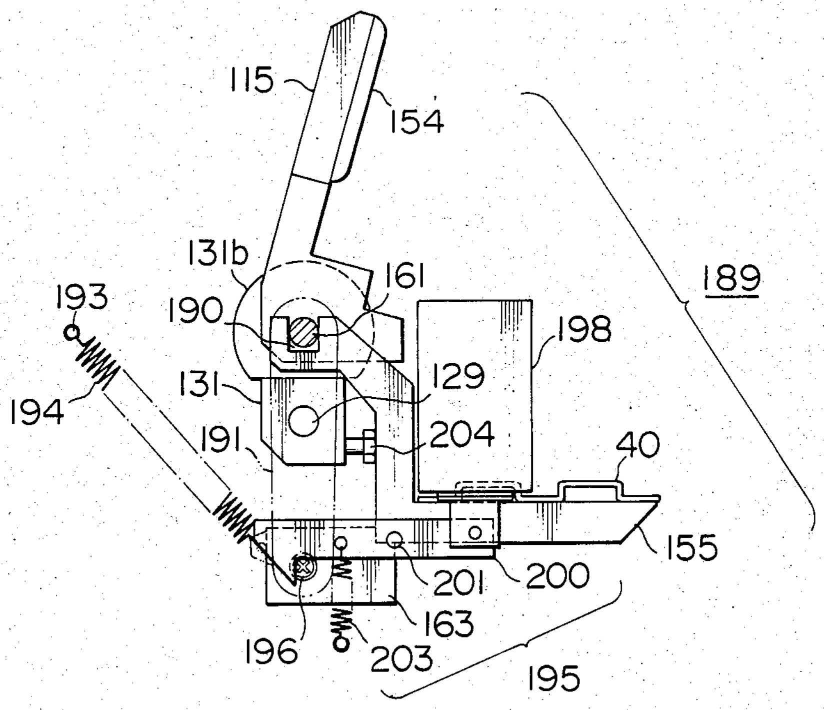

Next, description will be made of a front plate opening and closing device 189 (refer to FIG. 15). This front plate opening and closing device 189 moves a transverse pair of vertically arranged front plate arms 155 for supporting the storing front plate 40, in the directions indicated by arrows (a) and (b) in FIG. 6, so as to open and close the pair of storing front plates 40 with their center split. Incidentally, as shown in FIG. 1, the storing front plate 40 is provided in such a manner that a single storing front plate 40 spans and covers the first and second storing parts 22 and 23.

As mentioned earlier, the front plate arm 155 is made integral with the arm supporting member 163. However, as shown in FIG. 15, a U-shaped groove 190 gently clamps the shaft 161, and the front plate arm 155 is allowed to swing with this shaft 161 as its rotating center. Also, since the arm supporting member 163 is slidable with respect to the shaft 162, as shown in FIG. 4, the front plate arm 155 is supported in such a manner as to be vertically movable. In addition, as shown in FIG. 4, a shaft 125, which makes a pair with the shaft 161, is disposed along the same axis, and a coupling arm 191 rotated about the shaft 125 is swingably provided on the shaft 125. The shaft 162 is provided integrally between the installing members 191, 192 of this coupling arm 191.

Furthermore, a spring 194 spans between the coupling arm 191 and a securing pin 193 in the vicinity thereof so as to urge the storing front plate 40 and the front plate arm 155 away from the storing parts 22 and 23.

Moreover, an engaging pin 196, which is a part of a locking mechanism 195, is provided integrally with a portion of the coupling arm 191. At the same time, this locking mechanism 195 is arranged such that a solenoid 198 is provided on a unit plate 197 immediately above the second storing part 23, and a locking plate 200 is operated by this solenoid 198 via a coupling shaft 199. The swinging of this locking plate 200 about a shaft 201 hooks a hook-shaped engaging part 202 onto the engaging pin 196 so as to lock the locking plate 200. Further, the engaging portion 202 of the locking plate 200 is constantly urged by a spring 203 such as to be retained in the locked state. By energizing the solenoid 198, the locked state can be cancelled.

In other words, the locking plate 200 locks the coupling arm 191, and secures the storing front plate 40 at the front end portions of the storing parts 22 and 23. Upon reception of an instruction for return, the solenoid 198 pushes the rear end portion of the locking plate 200 in the forward direction. Then, as the engaging portion 202 of the locking plate 200 rotates rearwardly about the shaft 201, the engaging pin 196 can be released. As the engaging pin 196 is thus unlocked, the coupling arm 191 rotates rearwardly about the shaft 161 and the shaft 25 on the same axis by means of the spring 194 provided to the coupling arm 191. As the coupling arm 191 rotates rearwardly, the arm supporting member 163 slidably supported by the shaft 162 which is in turn supported by the coupling arm 191, the front plate 155 supported by said member 163, or the storing front plate 40 supported by the arm 155, rotate rearwardly with the shaft 161 on the same axis as that of the shaft 125, thereby releasing the front portions of both the storing parts 22 and 23.

As the collective returning of bills is completed, the fan-shaped gear 124 begins to rotate reversely. This reverse rotation causes the upper arm 126 integrated with the gear 128 to rotate synchronously toward the side of the storing parts 22 and 23. This synchronous rotation in turn causes the arm supporting member 131 which is slidable along the coupling shaft 129 to rotate synchronously toward the storing parts 22 and 23. When this arm supporting member 131 rotates to the storing parts 22 and 23, the clamp arm 115 rotates outwardly with respect to the storing parts 22 and 23, i.e., to its stand-by position, via the shaft 161.

A positioning member 204, such as a bolt or the like, which has the function of coming into contact with the front plate arm 155 and checking the rotation thereof, is provided such as to project from the side surface of the arm supporting member 131. As the arm supporting member 131 rotates to its stand-by position, the aforementioned positioning member 204 pushes back the front plate arm 155 to its stand-by position. In other words, when the clam arm 115 rotates to its stand-by position, the front plate arm 155 is also pushed back to its stand-by position by the positioning member 204.

Incidentally, although this is not particularly related to the gist of the present invention, brief description will be made of the disbursing operation, distribution operation, initial setting, and operation at the time of completion of work.

When disbursing operation is undertaken, bills are paid out from the disbursing bill storing part 19 to 21 of the relevant denomination and are conveyed to the paying-out and accumulating section 5 along the dispensing route 55. In the course of this procedure, in a case where any abnormality is detected in the disbursing bill feed discriminating part 56, said bill(s) is fed to the discrimination route 10 and the distribution route 13 via the transfer route 58 and is returned to the storing part 19 to 21 of the relevant denomination of the bill(s) paid out.

When all the bills accumulated in the dispensing and accumulating section 5 are undamaged and can be disbursed, bills to be disbursed are delivered from the dispensing and accumulating section 5 to the depositing and disbursing bill storing section 3 by means of a delivering mechanism (not shown), and the shutter 4 is opened, thereby making it possible to take out the bills.

On the other hand, in a case where an instruction for distribution has been issued (automatically or by the input of an instruction), the undamaged bills inside the depositing and disbursing box 43 are paid out to the dispensing route 55, and are further fed to the discrimination route 10 via the transfer route 58.

In the discrimination route 10, the bills are scrutinized by the discriminating section 11 with regard to the denomination and obverse and reverse sides, and bills in the obverse state of each denomination are distributed to and accumulated by means of the distribution route, while bills in the reverse state are distributed to and accumulated in the second storing part 23, while other bills of abnormal feed (undamaged bills in respect of which some abnormality was detected adn those bills of a denomination whose corresponding storing part 19, 20 or 21 is full) are distributed and accumulated in the first storing part 22.

Thus, since both of the bills in the first and second storing parts 22 and 23 are undamaged ones, they are stored by conducting the aforementioned operation of storing undamaged bills twice at the time of the disbursing operation described earlier.

Incidentally, as the bills in the reverse state are accumulated in the second storing part, the conveying direction is reversed, and these bills in the reverse state are handled as obverse bills during the next operation of distribution.

Next, with regard to the operation of the initial setting, undamaged bills (obverse) of each denomination are first set in the undamaged bill storing section of the depositing and disbursing box 43 (between the front plate 44 and the reciprocating plate 45), and are loaded in the machine body 1 (no bills have yet been accumulated in the machine body 1).

Then, if an instruction for the initial setting is issued, the same operation as the aforementioned operation of distribution is effected, and undamaged bills are accumulated in each storing part 19 to 21, thereby making it possible to deal with them.

Lastly, upon issuance of an instruction for completion of operation when the work is completed, the undamaged bills in each dispensing accumulating part 19 to 21 are dispensed consecutively, and are all accumulated in the first storing part 22 via the dispensing route 55, transfer route 58, discrimination route 10, and distribution route 13.

As the specified number of undamaged bills are accumulated, the bills inside the first storing part 22 are consecutively stored as undamaged bills as in the case of the above-described operation of storing undamaged bills, and when all the undamaged bills inside the disbursing bill storing parts 19 to 21 are housed inside the depositing and disbursing box 43, the operation of collection at the time of completion of work is completed.

According to the present invention, received bills sorted into two categories of undamaged and damaged bills are accumulated and stored in an upright state in the front and vertical positions of the machine body, and the accumulated and stored bills are fed into the depositing and disbursing box in the lower portion of said depositing and disbursing box by clamping said bills. Consequently, it becomes possible to effect smooth storage of bills by making effective use of the limited space within the machine body and, at the same time, to make the width of the machine body smaller. In addition, since the accumulating and storing sections for undamaged and damaged bills and the depositing and disbursing box are disposed in the front positions of the machine body, it becomes possible to effect the management of bills on the front side of the machine body, thereby enhancing the handling efficiency.

Furthermore, a number of bills are accumulated reversely in a storing section, and, at the same time, bills are set in an upright state by a striking-in wheel which rotates faster than an accumulating wheel, and the bills are retained in this state. Additionally, bills are guided to their upright state by an auxiliary belt provided on a storage bottom plate.

Furthermore according to the present invention, received bills are sorted into two categories of undamaged and damaged bills, and either the undamaged group or the damaged group of bills in the sorted state are accumulated and stored in an upright state in the reverse direction of accumulation. Furthermore, as the bills are directed vertically along a branch from the discrimination roue and are set in an upright state, it becomes possible to reduce the vertical dimension of the storing section. Also, the reverse accumulation procedure makes it possible to reverse the bills in obverse or reverse states, thereby enlarging the scope of use. Furthermore, it becomes possible to positively effect the accumulating operation by the fast rotation of the striking-in wheel provided in the accumulating wheel, and, at the same time, it becomes possible to effectively set the bills in an upright state by means of the auxiliary belt on the storage bottom plate. Consequently, it becomes possible to effect smooth storage of bills by making effective use of the limited space within the machine body and, at the same time, to make the width of the machine body smaller. In addition, since the accumulating and storing sections for undamaged and damaged bills and the depositing and disbursing box are disposed in the front portion of the machine body, it becomes possible to effect the management of bills on the front side of the machine body, thereby enhancing the handling efficiency.

I claim:

1. A circulating-type bill depositing and disbursing machine allowing received bills to be reused as dispensable ones, comprising: a first and second storing parts for storing the received bills after sorting the same into undamaged and damaged bills; a depositing and disbursing box for storing the undamaged and damaged bills in said first and second storing parts and for using only the undamaged bills stored as dispensable ones; and a disbursing bill storing section divided into denominations for accumulating the undamaged bills dispensed from said depositing and disbursing box and for dispensing bills according to the amount of money specified to be disbursed, said first and second storing parts being provided in the front and vertical positions of a machine body and being provided with a storing front plate and a holding plate capable of reciprocating vertically between the same and said depositing and disbursing box and of clamping the undamaged and damaged bills in an upright position, as well as a storage bottom plate for supporting the undamaged and damaged bills which is coupled with said storing front plate.

2. A circulating-type bill depositing and disbursing machine according to claim 2, wherein said storage bottom plate is capable of retracting for stand-by at the time when the undamaged and damaged bills are supplied into said depositing and disbursing box.

3. A circulating-type bill depositing and disbursing machine allowing received bills to be reused as dispensable ones, comprising: a storing section for storing received bills; a depositing and disbursing box for storing the bills deposited in said storing section and for using said bills as dispensable ones; and a disbursing bill storing section divided into denominations for accumulating the undamaged bills dispensed from said depositing and disbursing box and for dispensing bills according to the amount of money specified to be disbursed, said storing section being provided with a pool mechanism for clamping bills in an upright state, and said pool mechanism having an accumulating wheel for forwardly feeding bills received at the lower position by clamping each bill between blades, a guide plate for guiding upwardly the tip of a bill clamped by said accumulating wheel so as to stand said bill upright, a storing front plate for setting bills in an upright position in the reverse direction of accumulation which is disposed such as to frontwardly oppose said guide plate, and a storage bottom plate for supporting the lower portion of bills in an upright state in the lower position of said storing front plate.

4. A circulating-type bill depositing and disbursing machine allowing received bills to be reused and dispensable ones, comprising: a first and second storing part for storing the received bills after sorting the same into undamaged and damaged bills; a depositing and disbursing box for storing the undamaged and damaged bills in said first and second storing parts and for using only the undamaged bills stored as dispensable ones; and a disbursing bill storing section divided into denominations for accumulating the undamaged bills dispensed from said depositing and disbursing box and for dispensing bills according to the amount of money specified to be disbursed, said first and second storing parts being provided with a pool mechanism for clamping the undamaged and damaged bills in an upright state, and one of said pool mechanisms having an accumulating wheel for forwardly feeding bills received at the lower position by clamping each bill between blades, a guide plate for guiding upwardly the tip of a bill clamped by said accumulating wheel so as to stand said bill upright, a storing front plate for setting bills in an upright position in the reverse direction of accumulation which is diposed such as to frontwardly oppose said guide plate, and a storage bottom plate for supporting the lower portions of bills in an upright state in the lower position of said storing front plate.

5. A circulating-type bill depositing and disbursing machine according to claim 3, wherein there is provided a striking-in wheel whose rotating area overlaps that of the blades of said accumulating wheel and which rotates along the central axis of the accumulating wheel.

6. A circulating-type bill depositing and disbursing machine according to claim 3, wherein on said storage bottom plate is provided an auxiliary belt for supporting the lower surfaces of the accumulated bills and for driving the bills toward said storing front plate.

* * * * *